United States Patent
Sakahara (10) Patent No.: US 8,272,483 B2
(45) Date of Patent: Sep. 25, 2012

(54) VEHICLE WET-TYPE MULTI-PLATE BRAKE DEVICE

(75) Inventor: Tatsuro Sakahara, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 759 days.

(21) Appl. No.: 12/374,516

(22) PCT Filed: Jul. 29, 2008

(86) PCT No.: PCT/JP2008/063931
§ 371 (c)(1),
(2), (4) Date: Mar. 9, 2009

(87) PCT Pub. No.: WO2009/081613
PCT Pub. Date: Jul. 2, 2009

(65) Prior Publication Data
US 2010/0012447 A1    Jan. 21, 2010

(30) Foreign Application Priority Data
Dec. 20, 2007    (JP) .................. 2007-329218

(51) Int. Cl.
*F16D 55/36*    (2006.01)
*F16D 65/54*    (2006.01)
*F16D 25/12*    (2006.01)
(52) U.S. Cl. .............. 188/71.5; 188/196 P; 192/85.62
(58) Field of Classification Search .............. 188/71.5, 188/71.6, 72.3, 264 R, 264 B, 264 D, 71.7, 188/71.8, 179, 192, 196 P; 192/85.39, 85.62, 192/85.59
See application file for complete search history.

(56) References Cited

U.S. PATENT DOCUMENTS
2,746,254 A * 5/1956 Lucien .............................. 92/51
3,550,728 A * 12/1970 Rabich et al. ................. 188/71.8
(Continued)

FOREIGN PATENT DOCUMENTS
FR    2 820 794 A1    8/2002
(Continued)

OTHER PUBLICATIONS
Office Action of the corresponding Chinese Application 200880000452.2 issued on Nov. 10, 2010.
(Continued)

*Primary Examiner* — Bradley King
*Assistant Examiner* — Vishal Sahni
(74) *Attorney, Agent, or Firm* — Birch, Stewart, Kolasch & Birch, LLP (57) ABSTRACT

In a vehicle wet-type multi-plate brake device, a piston sleeve 61 is slidably provided between an inner-peripheral surface of a hydraulic piston hole 57 accommodating a piston 55 and an outer-peripheral surface of the piston 55, and has a sliding resistance to move together with the piston 55. A return plate 67 is capable of coming into contact with only the sleeve 61 and of moving by a predetermined distance together with the sleeve 61. When a hydraulic pressure is supplied to an oil chamber 59, the piston 55 and the sleeve 61 move together by a predetermined distance C against a returning force of the return plate 67, and then only the piston 55 slides until coming into contact with a brake plate so that a positional relationship between the piston 55 and the sleeve 61 is constantly maintained and a stroke of the piston 55 is constantly maintained.

5 Claims, 4 Drawing Sheets

U.S. PATENT DOCUMENTS

| | | | |
|---|---|---|---|
| 3,811,366 A * | 5/1974 | Angelis et al. | 92/130 R |
| 3,958,670 A | 5/1976 | Anderson | |
| 4,334,597 A | 6/1982 | Tovagliaro | |
| 4,570,531 A * | 2/1986 | Anderson et al. | 92/52 |
| 4,807,725 A | 2/1989 | Woiler et al. | |
| 5,601,160 A * | 2/1997 | Horsch | 188/71.5 |
| 6,189,669 B1 * | 2/2001 | Kremer et al. | 192/70.12 |
| 6,202,814 B1 * | 3/2001 | Braford, Jr. | 192/70.12 |
| 6,264,009 B1 * | 7/2001 | Johnson | 188/72.6 |
| 6,357,558 B1 * | 3/2002 | Case et al. | 188/71.5 |
| 6,367,591 B1 | 4/2002 | Gosda | |
| 6,481,541 B2 * | 11/2002 | Taki et al. | 188/71.5 |
| 6,712,190 B2 * | 3/2004 | Kitaori et al. | 192/113.36 |
| 6,945,371 B2 * | 9/2005 | Schmidt | 188/71.6 |
| 7,281,619 B2 | 10/2007 | Kuhn | |

FOREIGN PATENT DOCUMENTS

| | | |
|---|---|---|
| JP | 51-18577 A | 6/1976 |
| JP | 61-160634 A | 7/1986 |
| JP | 63-231024 A | 9/1988 |
| JP | 2000-304078 A | 10/2000 |
| JP | 2002-337672 A | 11/2002 |

OTHER PUBLICATIONS

European Search Report issued in European Patent Application No. 08792137.5 on Jul. 18, 2012.

* cited by examiner

VEHICLE WET-TYPE MULTI-PLATE BRAKE DEVICE

BACKGROUND OF THE INVENTION

1. Field of the Invention

The present invention relates to a vehicle wet-type multi-plate brake device which is applicable to various vehicle brake devices including industrial vehicle brake devices and in which a mating plate attached to a frame support connected to an axle housing is configured to engage with or disengage from a friction plate attached to a brake hub connected to an axle shaft, and more particularly to, a vehicle wet-type multi-plate brake device provided with an automatic control mechanism for constantly maintaining a piston stroke of a hydraulic piston upon operating a brake.

2. Description of the Related Art

Among brake devices used for wheeled industrial vehicles such as a forklift and a vehicle for a specialized operation, a wet-type multi-plate brake is widely used in which a mating plate is configured to engage with or disengage from a friction plate by the use of a hydraulic piston.

In such a wet-type multi-plate brake, when the mating plate or the friction plate is abraded, a piston stroke of the hydraulic piston is changed, thereby causing a problem in that a braking time or a non-braking time after a brake operation is changed, a driving feeling is deteriorated, and then a necessary oil quantity is increased.

For this reason, as the conventional solution methods, there are disclosed a method of constantly maintaining a piston stroke by controlling a quantity of operation oil itself supplied to a hydraulic piston, a method of constantly maintaining a piston stroke by the use of a returning force of a sliding resistance produced in a piston seal of a hydraulic piston, and the like.

However, in the method of controlling the supplied oil quantity, it is disadvantageous in that an attachment space and a cost increase largely due to an increase in size of a device. Additionally, since there is a limitation in regulation amount in a stroke regulation using the piston seal, when the number of brake plates increases, a problem arises in that drag or the like occurs.

Additionally, a multi-plate brake device mounted with an automatic control mechanism for constantly maintaining a piston stroke of a hydraulic piston upon operating a brake is disclosed in, for example, Patent Document 1 (Japanese Patent Application Laid-Open No. 2000-304078).

Figure 4:
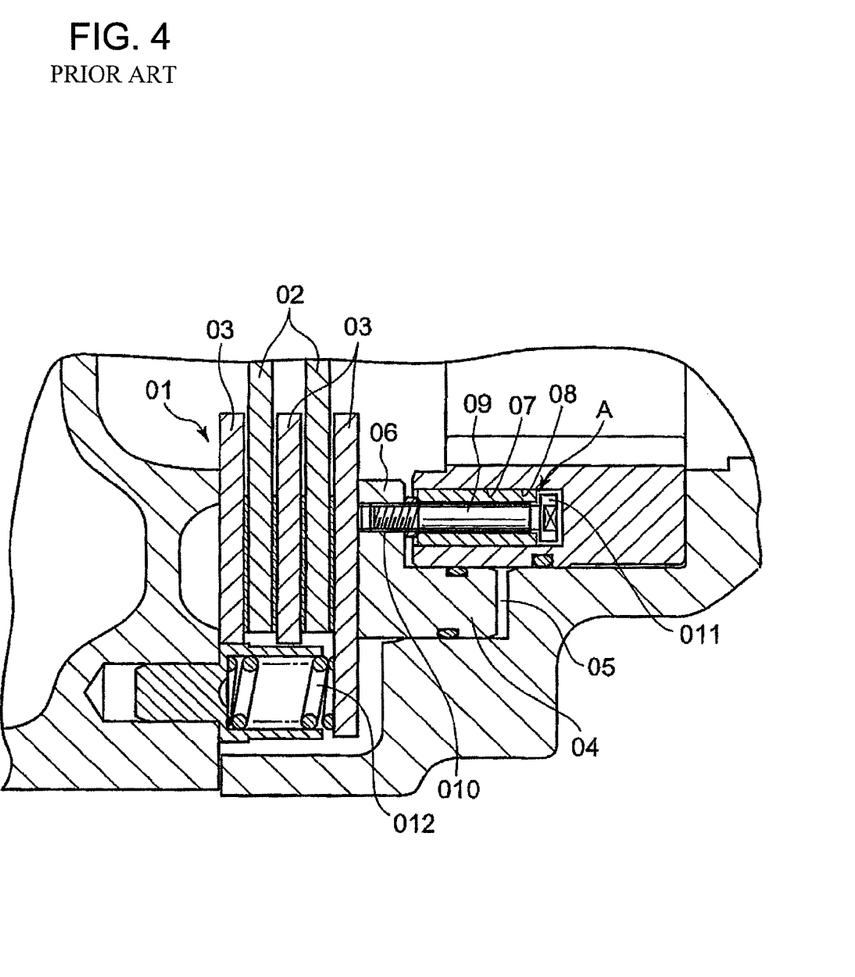
FIG. 4 is a sectional diagram illustrating a main part of the vehicle wet-type multi-plate brake device according to the conventional art.

As shown in FIG. 4, the technique disclosed in Patent Document 1 has a configuration in which an annular piston 04 is provided in order to operate a brake in such a manner that a disk-shape inner disk 02 and an annular outer disk 03 constituting a disk brake 01 engage with each other in a friction state, and a hydraulic pressure is supplied to an oil chamber 05 provided in rear of the piston 04 upon operating the brake.

Further, a hole 07 is provided so as to be opened toward an extending portion 06 of the piston 04, and a sleeve 08 is fitted to the hole 07 in a friction-engage state. Then, a bar 09 is inserted through a center portion of the sleeve 08 with a gap therebetween in a circumferential direction. One end of the bar 09 is screw-connected to the extending portion 06 of the piston 04 by a screw-connecting portion 010. Additionally, the other end of the bar 09 is provided with a head portion 011 opposed to the inner end surface of the sleeve 08 with a predetermined gap A therebetween.

Then, a sliding resistance produced by the friction-engagement between the hole 07 and the sleeve 08 is set to allow the sleeve 08 to advance when the piston 04 advances again in a state where the piston 04 advances by the predetermined gap A in terms of a hydraulic action and the head portion 011 engages with the end surface of the sleeve 08, but is set not to allow the sleeve 08 to recede when the piston 04 is receded by a return spring 012 upon removing the hydraulic pressure.

Accordingly, the sleeve 08 displaces in an advancing direction by the friction amount produced by the disks 02 and 03, and the gap A is constantly maintained all the time. For this reason, even when the disk 02 and 03 are abraded, the stroke of the piston 04 is constantly maintained all the time.

However, the automatic control mechanism for controlling the piston stroke of the hydraulic piston disclosed in Patent Document 1 (Japanese Patent Application Laid-Open No. 2000-304078) has the following problems to be solved.

Since the piston 04 is configured as one annular member, the contact surface of the piston 04 against the disks 02 and 03 is easily distorted. Accordingly, the motion of the piston 04 using the hydraulic pressure supplied to the oil chamber 05 cannot act uniformly in an axial direction. Also, the motion of the piston 04 cannot be high-precisely carried out in consideration of the abrasion states of the disks 02 and 03. For this reason, it is difficult to obtain the automatic control mechanism in which the movement stroke of the piston 04 is high-precisely set in consideration of the abrasion states of the disks 02 and 03.

That is, in order to maintain the predetermined gap A shown in Patent Document 1, the initial position of the sleeve 08 is set by the returning force of the return spring 012. However, since the return spring 012 urges the outer disk 03, urges the piston 04, and then urges the sleeve 08 via the piston 04, the initial position of the sleeve 08 is unstably determined upon returning the return spring 012, thereby causing a problem in that the stroke cannot be controlled with high precision.

Additionally, since the return spring 012 acts on the outer disk 03, when a return spring having a large spring constant is set in order to reliably return the piston 04, a force of the return spring increases with the abrasion states of the brake disks 02 and 03, thereby causing a problem in that a driving feeling is deteriorated.

Then, since an axial force of the sleeve 08 is controlled by the fitting state, it is difficult to carry out processing and assembling operations. Also, when the abrasion occurs in age, a function is damaged.

SUMMARY OF THE INVENTION

Therefore, the present invention is contrived in consideration of the above-described problems, and an object of the invention is to provide a vehicle wet-type multi-plate brake device capable of realizing an automatic control mechanism having a simple configuration and constantly maintaining a piston stroke of a hydraulic piston, the mechanism being reliably operated. Accordingly, it is possible to provide the vehicle wet-type multi-plate brake device which prevents brake dragging at a starting time and prevents loss torque at a starting time, thereby reducing deterioration in fuel efficiency and improving a driving feeling.

In order to achieve the above-described object, according to an aspect of the invention, there is provided a vehicle wet-type multi-plate brake device in which a mating plate attached to a frame support connected to an axle housing is configured to engage with or disengage from a friction plate attached to a brake hub connected to an axle shaft by the use of a hydraulic piston, a plurality of the hydraulic pistons being provided in a circumferential direction around a brake center and each hydraulic piston being provided with an oil chamber to which operation oil acting on the hydraulic piston is supplied, wherein an annular piston sleeve is slidably provided between an inner-peripheral surface of a hydraulic piston hole accommodating the hydraulic piston and an outer-peripheral surface of the hydraulic piston, wherein the piston sleeve has a sliding resistance so as to move together with the hydraulic piston upon supplying a hydraulic pressure to the oil chamber, wherein a return plate urged by a returning force is disposed so as to be capable of coming into contact with a front end of the piston sleeve and of moving by a predetermined distance, and wherein upon supplying the hydraulic pressure to the oil chamber, the hydraulic piston and the piston sleeve move together by the predetermined distance against the returning force of the return plate, and then only the hydraulic piston slides until coming into contact with a brake plate so that a positional relationship between the piston sleeve and the hydraulic piston is controlled to constantly maintain a piston stroke of the hydraulic piston.

According to the invention, in the vehicle wet-type multi-plate brake device in which the plurality of hydraulic pistons is provided in a circumferential direction around the brake center and each hydraulic piston is provided with the oil chamber to which the operation oil acting on the hydraulic piston is supplied, the piston sleeve is provided for each of the plurality of hydraulic pistons provided in a circumferential direction, thereby forming the automatic control mechanism for constantly controlling the piston stroke of the hydraulic piston. Accordingly, a piston operation error (stick) more hardly occurs than the automatic control mechanism using one annular hydraulic piston according to the conventional art, thereby obtaining the stable and high-precise automatic control mechanism.

That is, according to the present invention, the annular piston sleeve is slidably provided between the inner-peripheral surface of the hydraulic piston hole accommodating the hydraulic piston and the outer-peripheral surface of the hydraulic piston. The piston sleeve has the sliding resistance so as to move together with the hydraulic piston upon supplying the hydraulic pressure to the oil chamber. The return plate urged by the returning force is disposed so as to be capable of coming into contact with the front end of the piston sleeve and of moving by the predetermined distance. Upon supplying the hydraulic pressure to the oil chamber, the hydraulic piston and the piston sleeve move together by the predetermined distance against the returning force of the return plate, and then only the hydraulic piston slides until coming into contact with the brake plate.

Then, when the hydraulic pressure is opened, the hydraulic piston and the piston sleeve having a predetermined positional relationship therebetween return together by the predetermined distance by the use of the returning force of the return spring attached to the return plate, thereby becoming an initial state.

When the brake is operated again, the piston sleeve just slides on the return plate, and the positional relationship between the piston sleeve and the hydraulic piston is maintained at the predetermined relationship. When the brake plate is abraded, the hydraulic piston slightly slides in an advancing direction, and a total stroke (movement oil quantity) is constantly maintained.

In this manner, since it is possible to constantly maintain the piston stroke of the hydraulic piston, it is possible to reduce the deterioration in fuel efficiency by preventing the brake dragging at the starting time and the high-speed driving time and by preventing the loss torque. Also, it is possible to constantly maintain the piston operation oil quantity.

Then, since the return plate urged by the returning force returns to the initial position by directly coming into contact with the piston sleeve, it is possible to accurately set the initial position and thus to obtain the automatic control mechanism with high precision.

In the vehicle wet-type multi-plate brake device with the above-described configuration, a first piston seal may be provided on an outer-peripheral side of the piston sleeve and a second piston seal may be provided on an inner-peripheral side of the piston sleeve; and a sliding resistance of the second piston seal may be larger than that of the first piston seal.

According to the invention, since the sliding resistance of the second piston seal provided on the inner-peripheral side of the piston sleeve is larger than that of the first piston seal provide on the outer-peripheral side of the piston sleeve, the hydraulic piston and the piston sleeve are simultaneously capable of sliding on the inner-peripheral surface of the hydraulic piston hole.

Specifically, the first piston seal is formed of seal material such as Teflon (trade mark), and the first piston seal is fitted to a concave groove provided in the outer periphery of the piston sleeve. The second piston seal is formed of seal material such as rubber, and the second piston seal is fitted to a concave groove provided in the outer periphery of the hydraulic piston. Then, the second piston seal is formed in a rectangular shape in a sectional view so that a sliding resistance against the piston sleeve becomes larger.

In the vehicle wet-type multi-plate brake device with the above-described configuration, the plurality of hydraulic pistons provided in a circumferential direction around the brake center may be equally arranged in a vehicle-longitudinal direction centered on the brake center; the return plate may be urged by the returning force of the return spring; and the return spring may be equally disposed in a vehicle-longitudinal direction centered on the brake center.

In the above-described configuration, since the hydraulic piston and the return spring are equally arranged in a vehicle-longitudinal direction centered on the brake center, it is possible to uniformly apply the brake force using the hydraulic piston to a vehicle wheel and to reliably carry out the returning action of the piston sleeve for each hydraulic piston without deviation. Accordingly, it is possible to obtain the brake device provided with the stable and high-precise automatic control mechanism for controlling the piston stroke of the hydraulic piston.

In the vehicle wet-type multi-plate brake device with the above-described configuration, the return plate may be formed in an annular shape; a piston through-hole, through which the hydraulic piston is inserted, may be perforated in a circumferential direction so as to correspond to a position of the hydraulic piston; and a piston sleeve contact portion may be formed by an opening peripheral portion of the piston through-hole so as to come into contact with the front end of the piston sleeve.

In the above-described configuration, since the return plate is configured as an annular plate member, the piston through-hole is perforated in the plate member in a circumferential direction, and then the piston sleeve contact portion is formed by the opening peripheral portion of the piston through-hole so as to come into contact with the front end of the piston sleeve, it is possible to obtain the automatic control mechanism for reliably controlling the piston stroke of the hydraulic piston with a simple configuration.

In the vehicle wet-type multi-plate brake device with the above-described configuration, a sliding range of the return plate may be constantly maintained by the use of end surfaces of a piston housing and a brake housing. With such a configuration, it is possible to reliably set the predetermined distance with a simple configuration.

According to the invention, in the vehicle wet-type multi-plate brake device which includes the plurality of hydraulic pistons provided in a circumferential direction around the brake center and the oil chamber provided for each hydraulic piston so as to supply operation oil thereto, the automatic control mechanism is realized which have a simple configuration and constantly maintains the piston stroke of the hydraulic piston, the mechanism being reliably operated. Accordingly, it is possible to provide the vehicle wet-type multi-plate brake device which constantly maintains the piston operation oil quantity at the starting time and the high-speed driving time, prevents the brake dragging, and then prevents the loss torque, thereby reducing the deterioration in fuel efficiency and improving the driving feeling.

DETAILED DESCRIPTION OF THE INVENTION

Hereinafter, an embodiment of the invention will be described in detail with reference to the accompanying drawings. Here, although the dimension, the material, the shape, the relative arrangement, and the like of the component are described in the embodiment, the scope of the invention is not limited thereto so long as a particular description is not made, but those are only examples for a description.

Figure 1:
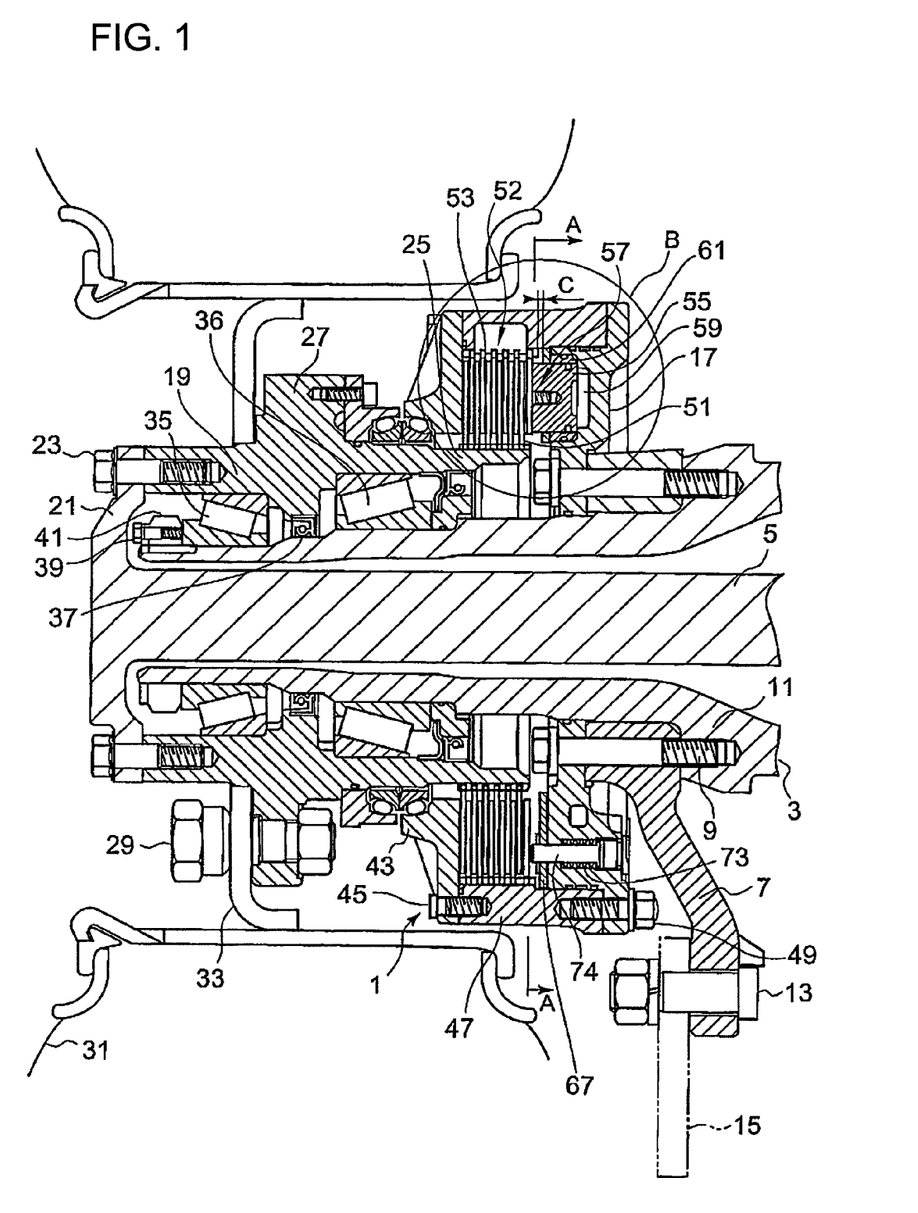
FIG. 1 is a sectional diagram illustrating a vehicle wet-type multi-plate brake device according to an embodiment of the invention.
Figure 2:
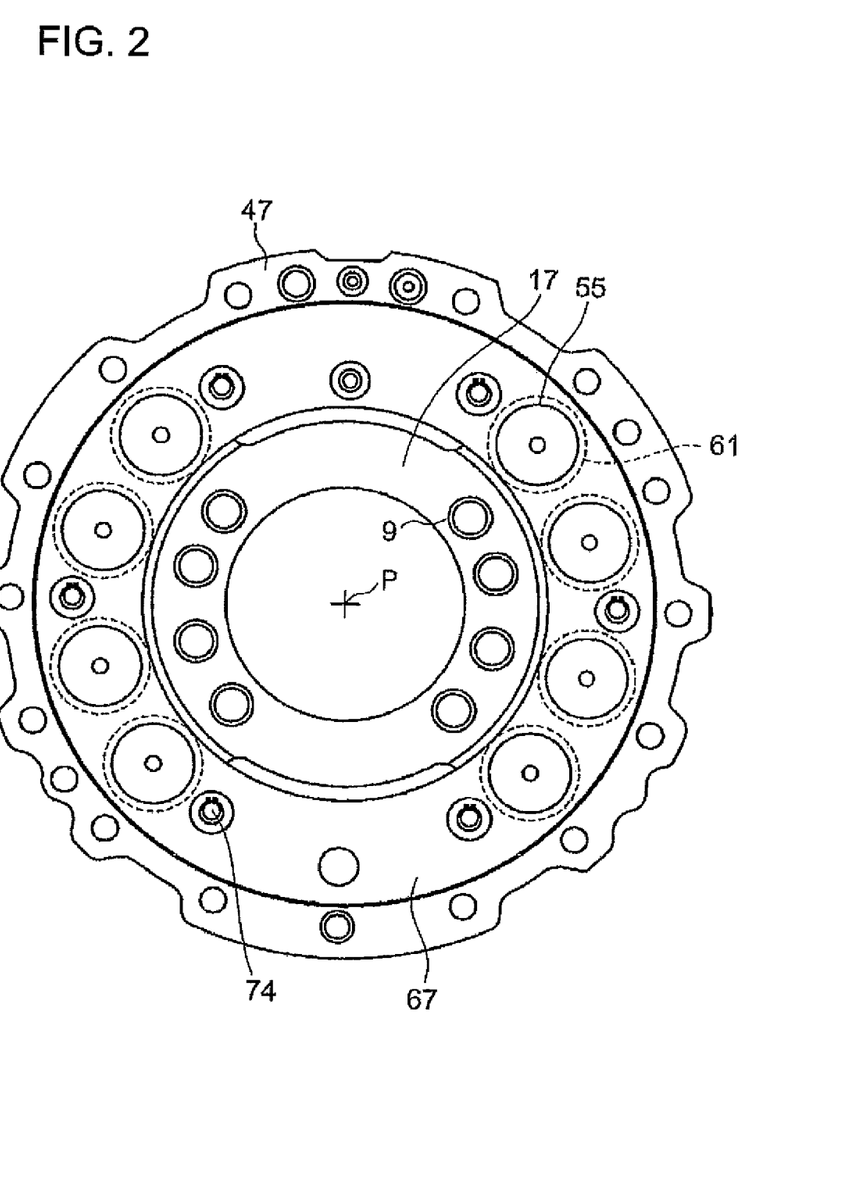
FIG. 2 is a diagram taken along the arrow A-A shown in FIG. 1.

FIG. 1 is a longitudinal sectional diagram illustrating a structure of the wet-type multi-plate brake device according to the embodiment of the invention. FIG. 2 is a diagram taken along the arrow A-A shown in FIG. 1.

In FIGS. 1 and 2, a wet-type multi-plate brake 1 is provided between a vehicle body side and a wheel side, and an axle shaft 5 is inserted through a center portion of a vehicle-body-side axle housing 3.

An inner-peripheral side of a frame support 7 formed in an annular shape is fixed to a flange portion 11 of the axle housing 3 by the use of a plurality of bolts 9 and an outer-peripheral side of the frame support 7 is fixed to a vehicle-body-side frame 15 by the use of a plurality of bolts 13. Additionally, an inner-peripheral side of a piston housing 17 is fixed to the axle housing 3 together with the frame support 7 by the use of the plurality of bolts 9 used to fix the inner-peripheral side of the frame support 7.

One end side of a wheel hub 19 is fixed to a flange portion 21 formed in an axial end of the axle shaft 5 by the use of a plurality of bolts 23, and the other end thereof is provided with a brake hub 25. Additionally, an outside of the wheel hub 19 is provided with an outside flange 27, and a rim 33 of a vehicle wheel 31 is fixed to the outside flange 27 by the use of a plurality of bolts 29.

Bearings 35 and 36 are provided to axially support the wheel hub 19 to the outer periphery of the end of the axle housing 3. The bearings 35 and 36 include two roller bearings capable of receiving the pressure of a radial load and a thrust load. Additionally, a seal ring 37 is provided between the inner periphery of the wheel hub 19 and the outer periphery of the end of the axle housing 3 so as to be disposed between the two bearings 35 and 36. Further, a nut 41 is provided to fix the bearings 35 and 36, and a bolt 39 is used to stop the nut 41 from spinning.

A brake cover 43 formed in an annular shape is fixed to a brake housing 47 formed in an annular shape by the use of a plurality of bolts 45. The brake housing 47 is fixed to the piston housing 17 by the use of a plurality of bolts 49.

Additionally, the outer-peripheral side of the brake hub 25 is provided with an external gear spline, and a plurality of friction plates 51 engages with the external gear spline so as to be movable in an axial direction. On the other hand, the inner periphery of the brake housing 47 is provided with an internal gear spline, and mating plates 53 engage with the internal gear spline so as to be movable in an axial direction while alternating with the friction plates 51.

The inside of the piston housing 17 is provided with a hydraulic piston hole 57 accommodating a plurality of piston sleeves 61 and hydraulic pistons 55 in a circumferential direction. As shown in FIG. 2, the hydraulic pistons 55 are equally provided at four positions on the front and rear sides of a brake center P in a vehicle-longitudinal direction, respectively, that is, eight positions in total so as to be fitted to the inside of the hydraulic piston holes 57 and to be movable in an axial direction.

Each hydraulic piston 55 is formed in a cylindrical shape. The front end of the hydraulic piston comes into pressing contact with a brake plate 52 including the friction plates 51 and the mating plates 53. The rear end of the hydraulic piston is provided with a cavity and faces an oil chamber 59.

The piston sleeve 61 is slidably fitted to the outer periphery of the hydraulic piston 55. Additionally, a first piston seal 63 formed of seal material such as Teflon (trade mark) and having a substantially circular sectional shape is fitted to a concave groove provided in the outer periphery of the piston sleeve 61. Then, a second piston seal 65 formed of seal material such as rubber and having a substantially rectangular sectional shape is fitted to a concave groove provided in the outer periphery of the hydraulic piston 55.

Then, a sliding resistance of the second piston seal 65 is set to be larger than that of the first piston seal 63.

Additionally, the plurality of hydraulic pistons 55 is disposed so as to penetrate piston through-holes 69 perforated in a circumferential direction of a return plate 67 having an annular shape. An inner diameter of each piston through-hole 69 is set so that an opening peripheral portion of the piston through-hole 69 is brought into contact with the front end of the piston sleeve 61, thereby forming the opening peripheral portion as a piston sleeve contact portion 71.

Then, the return plate 67 is urged toward the oil chamber 59 by a return spring 73 configured to generate a returning force for returning the hydraulic piston 55 to the inside of the hydraulic piston hole 57 when a hydraulic pressure of the oil chamber 59 is released. The return spring 73 is attached to the return plate 67 with a spring receiver 74 interposed therebetween. As shown in FIG. 2, the return springs are equally disposed on the front and rear sides of the brake center P in a vehicle-longitudinal direction, respectively, and are provided at three positions on one side with two hydraulic pistons 55 interposed therebetween.

Additionally, the returning force of the return spring 73 is set to be larger than the sliding resistance of the first concave piston seal 63 provided in the piston sleeve 61.

Likewise, since the hydraulic piston 55 and the return spring 73 are equally disposed on the front and rear sides of the brake center P in a vehicle-longitudinal direction, respectively, it is possible to uniformly apply a brake force using the hydraulic piston 55 to the vehicle wheel and to reliably carry out a returning action of the piston sleeve 61 for each hydraulic cylinder 55 without deviation. Accordingly, it is possible to obtain the brake device provided with a stable and high-precise automatic control mechanism for controlling a stroke of the hydraulic piston.

When the return plate 67 moves by a distance C shown in FIG. 1, the movement of the return plate is regulated since the return plate comes into contact with a stopper 75.

After the movement of the return plate 67 is regulated, only the hydraulic piston 55 advances further and comes into pressing contact with the brake plate including the friction plates 51 and the mating plates 53.

Additionally, the oil chamber 59 is provided for each hydraulic piston 55, and the hydraulic pressure is supplied thereto via an operation passageway (not shown) in accordance with a driver's brake operation.

The wet-type multi-plate brake device has the above-described configuration. Next, the automatic control mechanism for controlling the piston stroke of the hydraulic piston 55 will be described with reference to FIG. 3 together with the brake operation.

Figure 3:
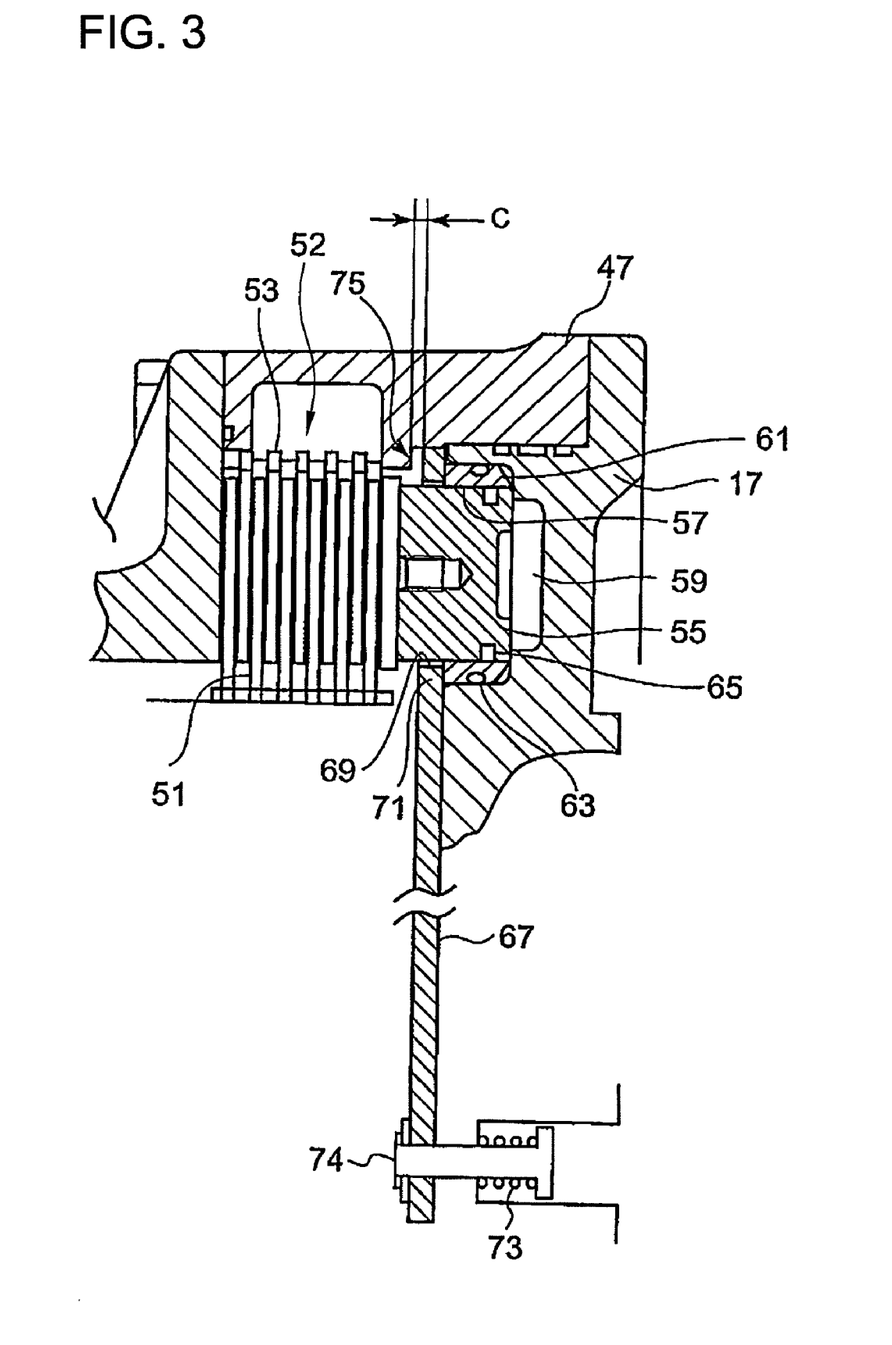
FIG. 3 is an enlarged explanatory diagram illustrating a B part shown in FIG. 1.

First, when the hydraulic pressure is supplied to the oil chamber 59 in terms of the brake operation, since the sliding resistance of the second piston seal 65 is larger than that of the first piston seal 63, the piston sleeve 61 starts to move together with the hydraulic piston 55. When the movement is started, since the hydraulic pressure acts on the rear-end surface of the hydraulic piston 55 and the rear-end surface of the piston sleeve 61, the hydraulic piston 55 and the piston sleeve 61 are extruded together.

Subsequently, the front end of the piston sleeve 61 comes into contact with the piston sleeve contact portion 71 formed by the opening peripheral portion of the return plate 67, and moves the return plate 67 up to the stopper 75 by the predetermined distance C against the returning force of the return spring 73.

Subsequently, again, in terms of the hydraulic action, only the hydraulic piston 55 advances and comes into pressing contact with the brake plate 52 including the friction plates 51 and the mating plates 53, thereby generating the brake force.

Subsequently, when the hydraulic pressure is released in the oil chamber 59 in terms of a driver's brake release operation, the return plate 67 returns by the predetermined distance C together with the piston sleeve 61 and the hydraulic piston 55 in terms of the returning force of the return spring 73 attached to the returning plate 67, thereby becoming an initial state.

At the time of retuning to the initial state, a positional relationship between the hydraulic piston 55 and the piston sleeve 61 is constantly maintained, and an initial gap is set to the distance C.

Subsequently, when the hydraulic pressure is applied to the oil chamber 59 by operating the brake again, the brake plate 52 is pressed in a state where the piston sleeve 61 just slides on the return plate 67, and the positional relationship between the piston sleeve 61 and the hydraulic piston 55 is maintained at the predetermined relationship.

Then, when the brake plate 52 including the friction plates 51 and the mating plates 53 is abraded, only the hydraulic piston 55 slightly slides in an advancing direction, and a new positional relationship between the hydraulic piston 55 and the piston sleeve 61 is created at the advanced position. The stroke (movement oil quantity) of the hydraulic piston 55 is constantly maintained at the distance C, and the brake operation is carried out.

According to the above-described embodiment, since the automatic control mechanism for constantly controlling the piston stroke of the hydraulic piston 55 has a configuration in which the piston sleeve 61 is provided for each of the plurality of hydraulic pistons 55 provided in a circumferential direction, it is possible to obtain the automatic control mechanism which is more stable and precise than the automatic control mechanism using one annular hydraulic piston according to the conventional art.

Additionally, the annular piston sleeve 61 is slidably provided between the outer-peripheral surface of the hydraulic piston 55 and the inner-peripheral surface of the hydraulic piston hole 57 accommodating the hydraulic piston 55. The piston sleeve 61 has the sliding resistance so as to move together with the hydraulic piston 55 when the hydraulic pressure is supplied to the oil chamber 59. Additionally, the return plate 67 urged by the returning force of the return spring 73 comes into contact with only the piston sleeve 61 so as to move by the predetermined distance together with the piston sleeve 61. When the hydraulic pressure is applied to the oil chamber 59, the hydraulic piston 55 moves together with the piston sleeve 61 by the predetermined distance C against the returning force of the return plate 67. Subsequently, only the hydraulic piston 55 slides until coming into contact with the brake plate 52. With such a configuration, since the positional relationship between the hydraulic piston 55 and the piston sleeve 61 is constantly maintained so that the hydraulic piston comes into contact with the brake plate 52, it is possible to constantly maintain the stroke (movement oil quantity) of the hydraulic piston 55 at the distance C.

As a result, it is possible to reduce deterioration in fuel efficiency by preventing brake dragging at a starting time and a high-speed driving time and by preventing loss torque.

Additionally, since the return plate 67 urged by the returning force of the return spring 73 returns to the initial position by being directly brought into contact with the piston sleeve 61, it is possible to accurately set the initial position and thus to obtain the high-precise automatic control mechanism.

Further, the return plate 67 is formed in an annular shape and the piston through-hole 69, through which the hydraulic piston 55 is inserted, is perforated in a circumferential direction so as to correspond to the position of the hydraulic piston 55. The piston sleeve contact portion 71 is provided in the opening peripheral portion of the piston through-hole 69 so as to come into contact with the front end of the piston sleeve 61. With such a simple configuration of the return plate 67 and the piston sleeve 61, it is possible to obtain the automatic control mechanism for reliably controlling the piston stroke.

Furthermore, since the sliding range of the return plate 67 is set by the use of the end surfaces of the brake housing 47 and the piston housing 17, it is possible to reliably set the predetermined distance C with a simple configuration.

Industrial Applicability

According to the invention, in the vehicle wet-type multi-plate brake device which includes the plurality of hydraulic pistons provided in a circumferential direction around the brake center and the oil chamber provided for each hydraulic piston so as to supply operation oil thereto, it is possible to obtain the automatic control mechanism having a simple configuration and constantly maintaining the piston stroke of the hydraulic piston, the mechanism being reliably operated. Accordingly, it is possible to provide the vehicle wet-type multi-plate brake device which prevents the brake dragging at the starting time and the high-speed driving time, and prevents loss torque, thereby reducing the deterioration in fuel efficiency and further improving the driving feeling.

The invention claimed is:

1. A vehicle wet-type multi-plate brake device in which a mating plate attached to a frame support connected to an axle housing is configured to engage with or disengage from a friction plate attached to a brake hub connected to an axle shaft by a plurality of hydraulic pistons, the hydraulic pistons being provided in a circumferential direction around a brake center and each hydraulic piston being provided with an oil chamber to which operation oil acting on each hydraulic piston is supplied,
wherein an annular piston sleeve is slidably provided between an inner-peripheral surface of a piston housing and an outer-peripheral surface of the hydraulic piston, an inner peripheral surfaces of the annular piston sleeves defining a plurality of hydraulic piston holes accommodating the hydraulic pistons,
wherein the piston sleeve has a sliding resistance so as to move together with each hydraulic piston upon supplying a hydraulic pressure to the oil chamber, wherein a return plate urged by a returning force is disposed so as to be capable of coming into contact with a front end of the piston sleeve and of moving by a predetermined distance,
wherein upon supplying the hydraulic pressure to the oil chamber, the hydraulic piston and the piston sleeve move together by the predetermined distance against the returning force of the return plate, and then only the hydraulic piston slides until coming into contact with a brake plate, including the friction plate and the mating plate, so that a positional relationship between the piston sleeve and the hydraulic piston is controlled to maintain a constant piston stroke of the hydraulic piston, and
wherein the return plate is annular in shape and defines a plurality of piston through-holes, penetrating the return plate, formed at an equal distance from a center of the return plate,
wherein the hydraulic pistons are inserted in the plurality of piston through-holes, and
wherein the return plate has a plurality of piston sleeve contact portions, formed in a periphery of the plurality of piston through-holes, that come into contact with the front end of the piston sleeves.

2. The vehicle wet-type multi-plate brake device according to claim 1,
wherein a first piston seal is provided on an outer-peripheral side of each piston sleeve and a second piston seal is provided on an inner-peripheral side of each piston sleeve, and
wherein a sliding resistance of the second piston seals is larger than that of the first piston seals.

3. The vehicle wet-type multi-plate brake device according to claim 1, wherein the plurality of hydraulic pistons provided in a circumferential direction around the brake center are equally arranged in a vehicle-longitudinal direction centered on the brake center.

4. The vehicle wet-type multi-plate brake device according to claim 1, wherein the return plate is urged by a return force of a return spring, and
wherein the return spring is equally disposed in a vehicle-longitudinal direction centered on the brake center.

5. The vehicle wet-type multi-plate brake device according to claim 1, wherein a constant sliding range of the return plate is maintained by end surfaces of the piston housings that house each hydraulic piston and a brake housing the houses the brake plate.

* * * * *